United States Patent [19]

Mulvaney et al.

[11] 4,047,431
[45] Sept. 13, 1977

[54] WIND CHILL FACTOR INDICATOR

[75] Inventors: Ronald J. Mulvaney, 1201 W. 5th, Dubuque, Iowa 52001; Cecil L. Moore, Dubuque, Iowa

[73] Assignee: said Ronald J. Mulvaney, by said Cecil L. Moore; a part interest

[21] Appl. No.: 716,075

[22] Filed: Aug. 20, 1976

[51] Int. Cl.² .............................................. G01W 1/17
[52] U.S. Cl. ................................... 73/170 R; 73/339 C
[58] Field of Search ................ 73/170 R, 339 C, 189, 73/212, 198

[56] References Cited

U.S. PATENT DOCUMENTS 1,056,513  3/1913  Dodge ..................................... 73/212
3,954,007  5/1976  Harrigan ............................. 73/170 R Primary Examiner—James J. Gill
Assistant Examiner—Anthony V. Ciarlante
Attorney, Agent, or Firm—Woodard, Weikart, Emhardt & Naughton

[57] ABSTRACT

Disclosed is an pitot-static tube whose sensed pressure is converted to a variable resistor setting, the resistor being series connected to a thermistor adapted to respond to outdoor temperature. A D.C. voltage is impressed across these elements in series with the coil of an indicating meter which is calibrated to indicate the wind chill factor or index determined by the temperature and wind magnitude sensed by the thermistor and pitot-static tube, respectively.

5 Claims, 2 Drawing Figures

WIND CHILL FACTOR INDICATOR

BACKGROUND OF THE INVENTION

Wind chill factor or index has come into increasing use as an indicator of dangerous cold weather conditions both for people who may be travelling and for exposed livestock. Fundamentally, it may be defined as the cooling effect of any combination of temperature and wind, expressed as the loss of body heat in kilogram calories per hour per square meter of skin surface. The apparatus of the present invention provides a simple, trouble free indicator for wind chill factor by sensing temperature and wind velocity and combining these electrically to provide a visual indication of the wind chill factor value.

DESCRIPTION OF THE PREFERRED EMBODIMENT

Figure 2:
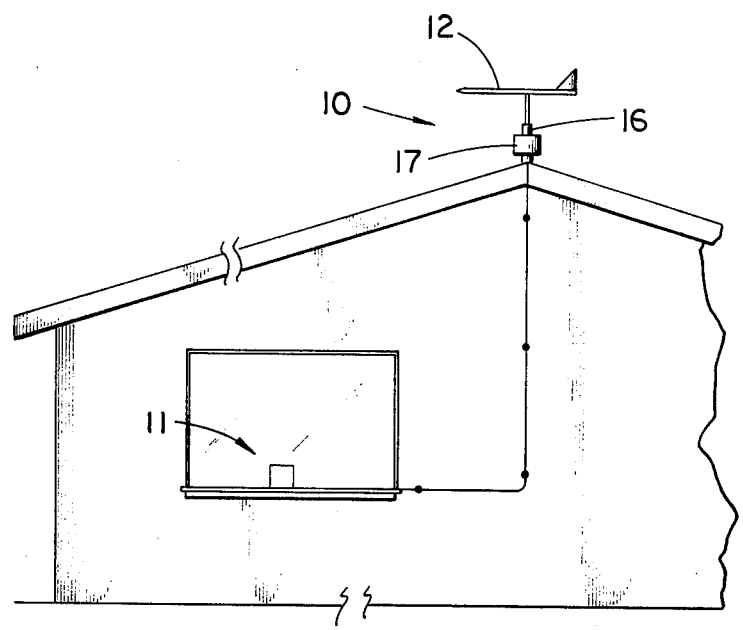
FIG. 2 is a fragmentary, schematic view illustrating the apparatus of FIG. 1 in a typical installation.

Referring to the drawings, the outdoor temperature and wind velocity sensing unit is indicated generally at 10 and, as may be seen in FIG. 2, this unit is electrically connected to a remote indicating component, indicated generally at 11, which may be placed on the interior of a housing or building.

Figure 1:
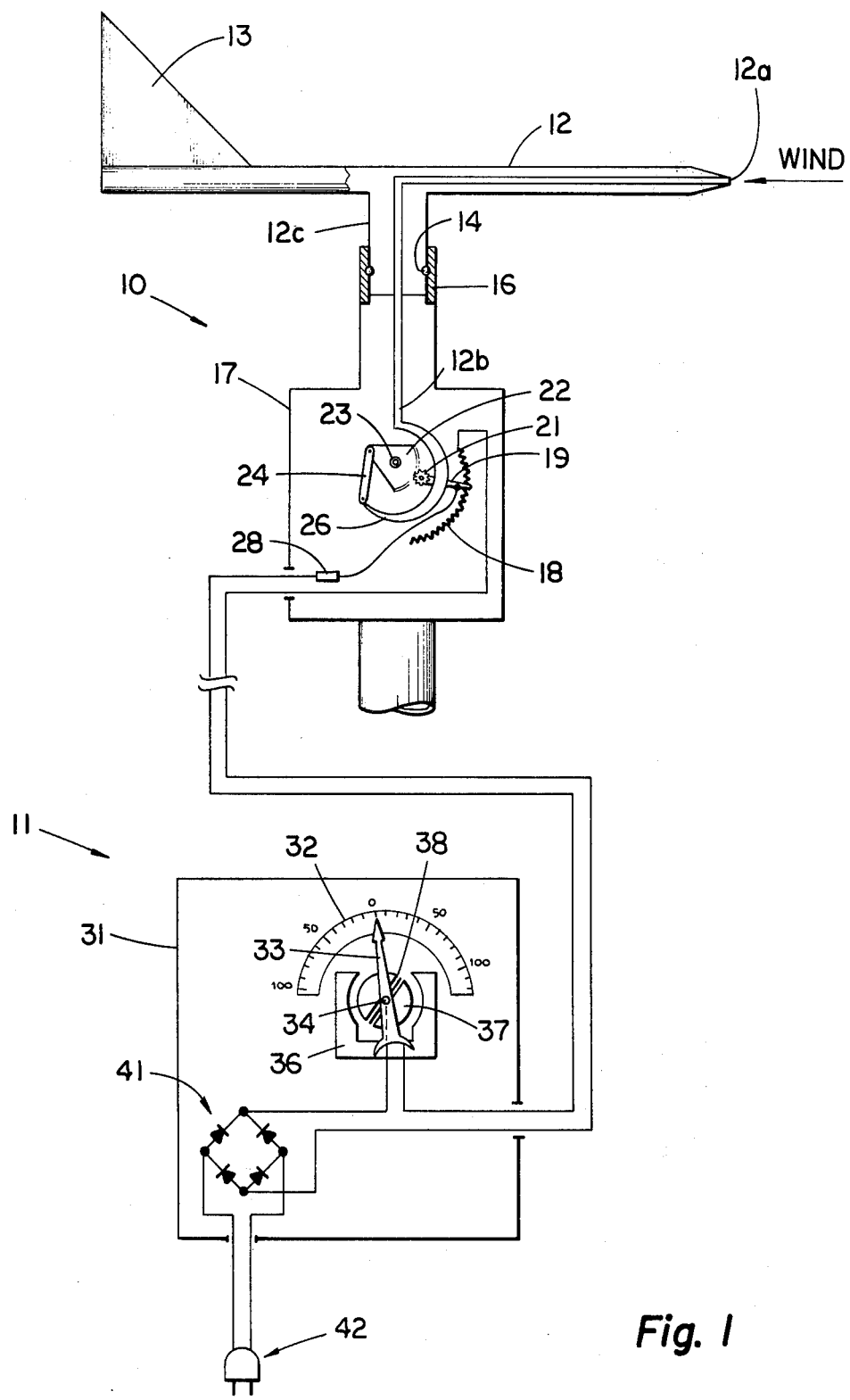
FIG. 1 is a schematic, front view of the apparatus of the present invention.

Referring specifically to FIG. 1, the component 10 may be seen to include a pitot-static tube 12 which has an open end 12a and a total pressure connecting end 12b, the operative portions of the pitot-static tube being conventional and having a typical right angle bend. A vane 13 attached to a sidewardly extending portion of the pitot-static tube functions, with the swivel mounting 14 of the downwardly extending portion 12c of the tube 12, to face the open end 12a of the tube into the wind.

The supporting neck 16 of a housing 17 (the remainder of the housing and its contents being shown in schematic form) supports the static tube portion 12c. The housing 17 encloses a variable resistor 18 which has a wiper arm 19. The wiper arm is conventionally, pivotally supported and is moved by a gear 21 which meshes with a sector gear 22 which is moved about its axis 23 by a link 24.

A transducer which may take the form of a conventional bourdon tube 26 is connected to the total pressure connection end 12b of the pitot-static tube 12 and the free end of the tube 26 is connected to link 24. The movement of the wiper arm 19 over the variable resistor 18, caused by the motion of the tip of the bourdon tube 26 in response to wind velocity serves to establish the effective electrical resistance of the resistor 18 as a function of wind velocity.

The wiper arm 19 of the variable resistor is connected by means of a flexible lead to a thermistor 28 which is a negative temperature coefficient of resistance element well known in the prior art.

As indicated in FIG. 1, the wiring, connecting the transistor 28 and variable resistor 18 in series extends to the remote indicating component 11. The indicating component includes a housing, schematically indicated at 31, which encloses an indicating meter which may, as shown, be of the D-Arsonval type for measuring direct current flow. An indicating scale 32 may be marked to indicate wind chill factor values and the needle or pointer 33 which cooperates with the scale is pivotally mounted on an axis 34. As is conventional in such indicating meters a permanent magnet 36 has pole pieces which face a soft iron core 37 across an air gap within which a fine wire coil 38 may move about the axis 34 into and out of the air gap. The wire coil 38 may be wound upon a suitable lightweight aluminum frame and this frame and the coil are locked to the needle 33 so that movement of the coil moves the needle. The ends of the coil are connected in series with the variable resistor 18 and the thermistor 28 and across these series connected components is connected the output of a conventional full-wave rectifier 41, the rectifier serving as the source of power to the circuit and having a conventional 115 volt AC input as indicated at 42.

In operation, the sum of the electrical resistance provided by the variable resistor 18 and the thermistor 28 will be determined by the wind velocity, sensed by the tube 12, and the temperature sensed by the thermistor 28 and the sum of these resistances will determine the DC current flow through the indicating meter coil 38 and will thus determine the position of the needle 33, giving an indication of the wind chill factor. It will be understood that while the transducer element shown and described is a bourdon tube structure, other means for transforming the wind velocity into a measured electrical resistance might be utilized.

While the invention has been disclosed and described in some detail in the drawings and foregoing description, they are to be considered as illustrative and not restrictive in character, as other modifications within the scope of the invention may readily suggest themselves to persons skilled in the art.

We claim:

1. A wind chill factor indicator comprising a pitot-static tube mounted out-of-doors for swivel movement and having a vane adapted to face the open end of the tube into the wind, a variable resistor having a wiper arm mounted adjacent the total pressure connection end of the tube, a transducer connected between the pressure connection end of said tube and said wiper arm for converting the pressure in said tube into motion of said wiper arm, a thermistor mounted to be responsive to outdoor ambient temperature, an indicating meter having a coil adapted to induce movement of an indicating needle proportional to electrical current flow through the coil, a source of electrical power, and wiring means connecting said resistor, thermistor, meter coil and source of power, whereby the current flow through said meter coil, and hence the position of said indicating needle, is a function of both the wind velocity and temperature sensed by said tube and thermistor.

2. A wind chill factor indicator as claimed in claim 1 in which said transducer takes the form of a bourdon tube having its interior communicating with the interior of said pitot-static tube, and gear means interposed between the free end of said bourdon tube and said variable resistor wiper arm, whereby linear motion of said tube end is transformed into pivotal motion of said wiper arm.

3. A wind chill factor indicator as claimed in claim 1 in which said indicating meter and said source of electrical power are located in-doors remote from said pitot-static tube and said thermistor.

4. A wind chill factor indicator as claimed in claim 1 in which said wiring means connects said variable resistor, thermistor, meter coil and source of electrical power all in series.

5. A wind chill factor indicator comprising a directionally controlled total wind pressure magnitude sensing element, a variable resistor, a transducer for transforming the total wind pressure sensed by said element into an electrical resistance, said transducer including a bourdon tube pneumatically connected to said sensing element, linkage means actuated by said bourdon tube for determining the electrical resistance of said variable resistor, a thermistor exposed to outdoor temperature, an electrical circuit connecting said variable resistor and said thermistor in series across a power source and a remotely located indicating meter responsive to the variation of the current flow in said circuit for providing a continuous readout of the wind chill factor.

* * * * *